(12) United States Patent
Qiang et al.

(10) Patent No.: US 8,413,089 B2
(45) Date of Patent: Apr. 2, 2013

(54) PERFORMING IMPLICATION AND DECISION MAKING USING MULTIPLE VALUE SYSTEMS DURING CONSTRAINT SOLVING

(75) Inventors: Qiang Qiang, Santa Clara, CA (US); Dhiraj Goswami, Wilsonville, OR (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/098,136

(22) Filed: Apr. 29, 2011

(65) Prior Publication Data

US 2012/0278675 A1    Nov. 1, 2012

(51) Int. Cl.
*G06F 17/50* (2006.01)
(52) U.S. Cl. .................. 716/106; 716/136
(58) Field of Classification Search .......... 716/106, 716/136; 714/25
See application file for complete search history.

(56) References Cited

U.S. PATENT DOCUMENTS

2005/0039077 A1*  2/2005  Iyer ................................. 714/25
2005/0044512 A1*  2/2005  Lockyear et al. .................. 716/1
2012/0136635 A1*  5/2012  Hung et al. ....................... 703/2

* cited by examiner

*Primary Examiner* — Vuthe Siek
(74) *Attorney, Agent, or Firm* — Park, Vaughan, Fleming & Dowler LLP; Laxman Sahasrabuddhe (57) ABSTRACT

Methods and apparatuses are described for assigning random values to a set of random variables so that the assigned random values satisfy a set of constraints. An embodiment can receive a set of constraints, wherein each constraint is defined over one or more random variables from a set of random variables. Next, the embodiment can generate a circuit model based on the set of constraints, wherein assignable values for at least one node in the circuit model are represented in multiple value systems. The embodiment can then assign random values to the set of random variables based on the circuit model.

27 Claims, 6 Drawing Sheets

$$C(a,b,c) = \overline{a} \cdot b \cdot c + a \cdot \overline{b} \cdot c + a \cdot b \cdot \overline{c}$$

PERFORMING IMPLICATION AND DECISION MAKING USING MULTIPLE VALUE SYSTEMS DURING CONSTRAINT SOLVING

BACKGROUND

1. Technical Field

This disclosure generally relates to constraint solvers. More specifically, this disclosure relates to methods and apparatuses for performing implication and decision making using multiple value systems during constraint solving.

2. Related Art

The importance of circuit verification cannot be over-emphasized. Indeed, without circuit verification it would be almost impossible to design complicated integrated circuits which are commonly found in today's computing devices.

As an alternative to directed-test based simulation, constrained random simulation methodologies are becoming increasingly popular for functional verification of complex designs. In a constrained random simulation methodology, random vectors are generated to satisfy certain operating constraints of the design. These constraints are usually specified as part of a test-bench program. A test-bench automation tool (TBA) uses the test-bench program to generate random solutions for a set of random variables, such that a set of constraints over the set of random variables is satisfied. These random solutions can then be used to generate valid random stimulus for the Design Under Verification (DUV). This stimulus is simulated using simulation tools, and the results of the simulation are typically examined within the test-bench program to monitor functional coverage, thereby providing a measure of confidence on the verification quality and completeness.

Constraint solvers are typically used to generate random vectors that satisfy the set of constraints. The basic functionality of a constraint solver is to solve the following constraint satisfaction problem: given a set of random variables and a set of constraints, assign a set of random values to the set of random variables that satisfy the set of constraints.

Conventional word-level constraint solvers can have poor performance if the constraints include bit-level operators. It is generally desirable to improve performance of constraint solvers because it can significantly improve the overall performance of constrained random simulation tools.

SUMMARY

Embodiments described in this disclosure provide methods and apparatuses for assigning random values to a set of random variables so that the assigned random values satisfy a set of constraints. Specifically, an embodiment (e.g., a constraint solver) can receive a set of constraints, wherein each constraint is defined over one or more random variables from a set of random variables. The set of constraints can include one or more constraints that use one or more bit-level operators. Next, the embodiment can generate a circuit model based on the set of constraints, wherein assignable values for at least one node in the circuit model are represented in multiple value systems, e.g., a word-level value system and a bit-level value system. The embodiment can then assign random values to the set of random variables based on the circuit model. Specifically, during value assignment, the embodiment can select a value for a node in the circuit model that satisfies the value ranges in each of the multiple value systems.

In some embodiments, the multiple value systems can include a word-level value system and a bit-level value system. In some embodiments, the assignable values associated with a node in the circuit model may be represented in the word-level value system by specifying a set of word-level intervals. In some embodiments, the assignable values associated with a node in the circuit model may be represented in the bit-level value system by specifying a set of bit-level intervals.

In some embodiments, generating the circuit model based on the set of constraints can include performing a reachability analysis on the circuit model to determine nodes whose assignable values are to be represented using multiple value systems, e.g., using both a word-level value system and a bit-level value system.

In some embodiments, assigning random values to the set of random variables can include performing implication in multiple value systems. Note that when implication is performed in a particular value system, the ranges in other value systems may be affected. For example, some embodiments may: (1) modify a bit-level representation of the assignable values based on performing a word-level implication on the circuit model, and/or (2) modify a word-level representation of the assignable values based on performing a bit-level implication on the circuit model.

In this disclosure, unless otherwise stated, the term "based on" means "based solely or partly on."

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
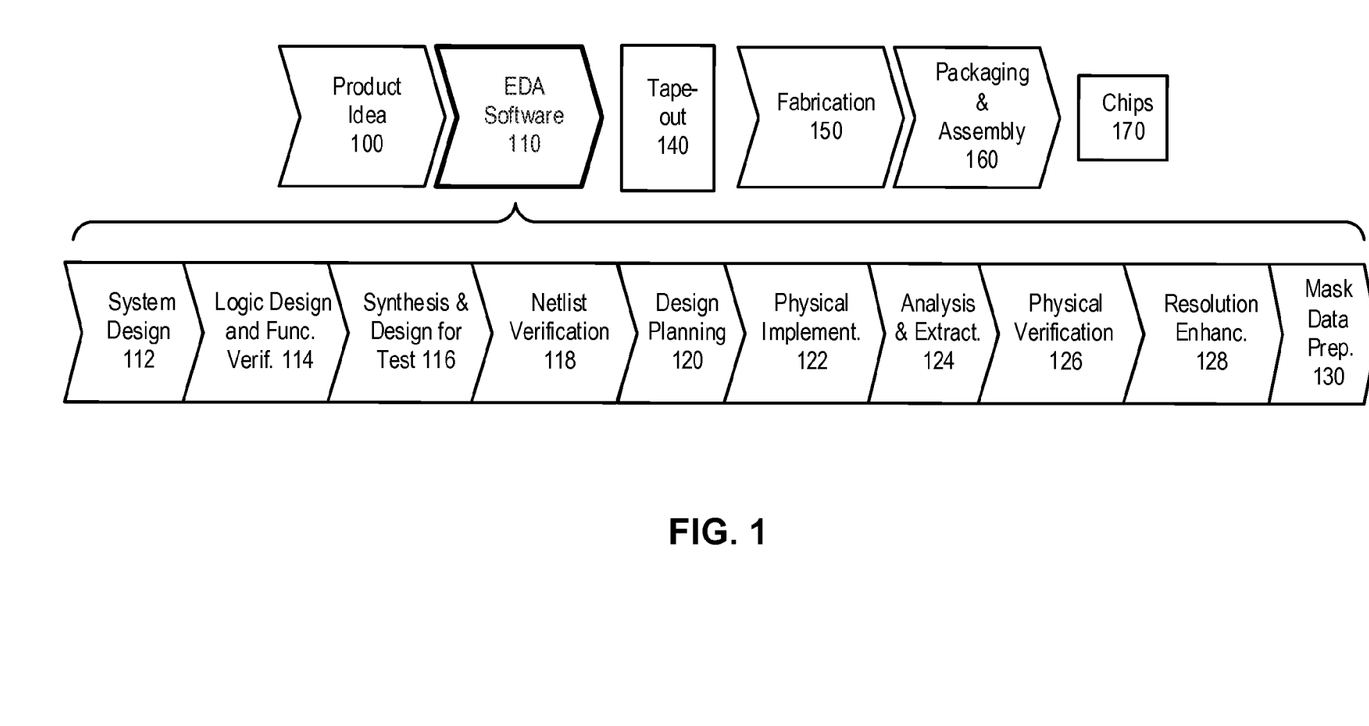
FIG. 1 illustrates various steps in the design and fabrication of an integrated circuit.

FIG. 1 illustrates various steps in the design and fabrication of an integrated circuit. The process can start with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out 140 for production of masks to produce finished chips.

Constraint Solvers

Constraint solvers can be based on ATPG or BDDs. Unlike BDD-based constraint solvers, ATPG-based constraint solvers may not guarantee a uniform distribution across the solution space. However, the worst-case runtime of a BDD-based constraint solver can be exponential in the size of the input problem. ATPG-based constraint solvers typically require less memory than BDD-based solvers.

An ATPG-based constraint solver can create a word-level circuit model to represent the constraints and use a word-level value system to represent possible values for all nodes in this model. Specifically, the word-level value system may use intervals to represent multiple values in a compact form. For example, let "a" be a 4-bit unsigned variable. Independent of the constraints on "a," the assignable values for "a" can be represented as {0:15}, i.e., from 0 to 15. Note that this compactly represents multiple values, without explicitly enumerating all the values. This representation can be referred to as an interval.

Suppose the constraint "a!=7" is imposed on variable "a." This constraint restricts the values "a" can have to {0:6}, {8:15}. Such a "set of word-level intervals" can be referred to as a range. If another constraint, "a>2," is added, the range that variable "a" can take is further restricted to {3:6}, {8:15}. A constraint problem that is based on these constraints can be stated as follows: determine random values for variable "a," such that all the constraints on variable "a" are satisfied. The above-described constraint problem can be represented by the following lines of code:

```
rand bit[3:0] a;
constraint C1 {
    a != 7;
    a > 2;
}
```

Figure 2:
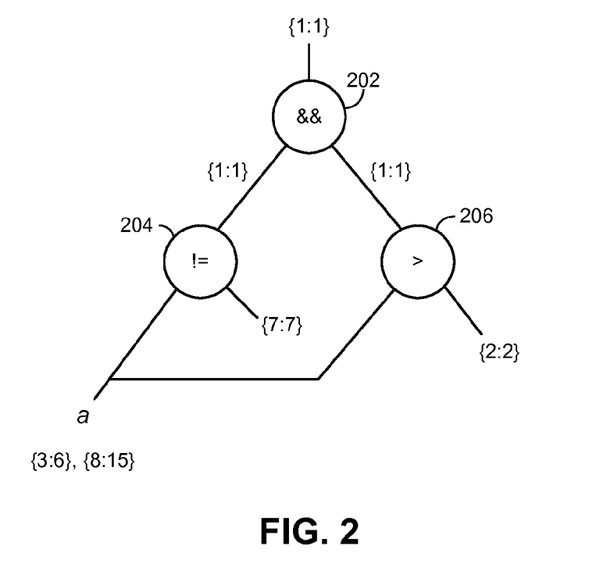
FIG. 2 illustrates a word-level circuit model that an ATPG (Automatic Test Pattern Generation)-based constraint solver may create for a constraint problem.

FIG. 2 illustrates a word-level circuit model that an ATPG-based constraint solver may create for a constraint problem.

An ATPG-based constraint solver may create a word-level circuit model that includes nodes 202, 204, and 206. Node 202 can correspond to conjunction of the set of constraints, node 204 can correspond to constraint "a!=7," and node 206 can correspond to constraint "a>2." The "&&" operator shown inside node 202 indicates that both constraints need to be satisfied.

After creating the word-level circuit model, the ATPG-based constraint solver can perform static implications to refine the range on each node in the circuit model.

Figure 3A:
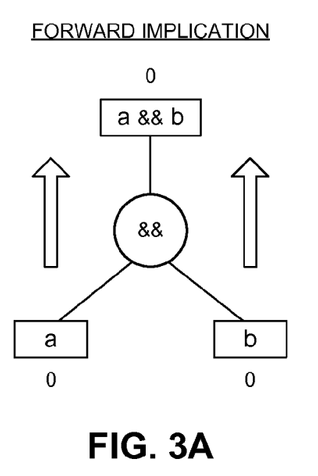
FIG. 3A illustrates an example of forward implication in accordance with some embodiments described in this disclosure.

FIG. 3A illustrates an example of forward implication in accordance with some embodiments described in this disclosure. As shown in FIG. 3A, if either variable "a" or variable "b" is known to be zero, then forward implication can be used to conclude that the logical AND operation of variables "a" and "b" (shown as "a && b" in FIG. 3A) will also be equal to zero.

Figure 3B:
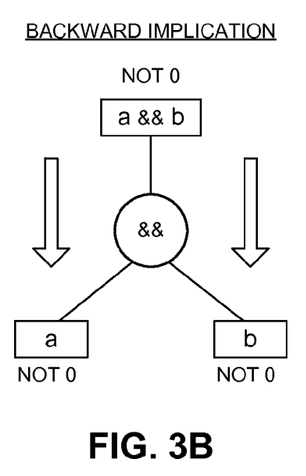
FIG. 3B illustrates an example of backward implication in accordance with some embodiments described in this disclosure.

FIG. 3B illustrates an example of backward implication in accordance with some embodiments described in this disclosure. As shown in FIG. 3B, if the logical AND operation of variables "a" and "b" is known to be non-zero, then backward implication can be used to conclude that the values of "a" and "b" cannot be zero.

Implication can also be performed for other standard logical operators (e.g., logical OR, logical AND, etc.) standard arithmetic operations (e.g., addition, subtraction, multiplication, etc.), relational operators (e.g., greater than, less than, etc.), and any other operators that may used in constraints.

The result of performing static implications on a word-level circuit model is shown in FIG. 2. Specifically, the range shown next to each node in the circuit model is the result of performing static implications. After performing static implications, the ATPG-based constraint solver can perform static learning to further refine the range. Then the ATPG-based constraint solver can perform random ATPG to pick and try values for the unassigned random variables.

For example, in the word-level circuit model illustrated in FIG. 2, suppose the ATPG-based constraint solver picks a random value "5" for variable "a." Once this value is picked, the constraint solver can invoke its implication engine to incrementally update the range in the circuit model and to determine if this value assignment to variable "a" results in any conflicts. For the value "5," the implication engine will evaluate the "!=" comparator node and the ">" comparator node to determine that there is no conflict. Therefore, the assignment "a=5" is determined as a legal random assignment that satisfies all the constraints.

If a conflict is encountered during the implication process, the constraint solver can backtrack on the last assigned variable and try other value assignment until the constraint solver identifies an assignment that does not result in any conflicts (if such a solution exists). Due to backtracking, the constraint solver may need to invoke its implication engine repeatedly, which can end up consuming a majority of the constraint solver's computation time. Further details of an ATPG-based constraint solver that uses a word-level value system can be found in U.S. Pat. No. 7,243,087, entitled "Method and Apparatus for Solving Bit-Slice Operators," by inventor Mahesh A. Iyer, issued on Jul. 10, 2007, the contents of which are herein incorporated by reference. Some embodiments described in this disclosure are directed to improve the performance of such ATPG-based constraint solvers.

One approach for improving the performance of ATPG-based constraint solvers is to reduce the amount of backtracking. Specifically, if the embodiment can increase the effectiveness of the implication engine, it can further restrict the ranges for the variables, which can reduce the occurrence of conflicts (and therefore backtracking) when a random value is chosen for a variable.

Some constraint solvers represent the set of constraints in a canonical representation (e.g., a BDD), and then use the canonical representation to determine solutions to the set of constraints. For example, if the set of constraints is represented by a BDD, each path in the BDD from the root node to the terminal node that corresponds to the value "1" can be associated with a value assignment that satisfies the set of constraints.

Figure 4A:
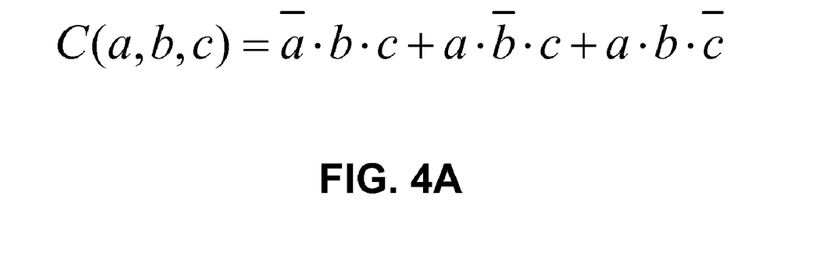
FIG. 4A illustrates a constraint.

FIG. 4A illustrates a constraint which is expressed as a Boolean function over three variables: "a," "b," and "c." The variables may model signals in the DUV, e.g., the variable "a" may be a random variable that represents the logic state of an input signal in the DUV. Variable "b" may be a state variable that represents the output of a logic gate in the DUV.

Figure 4B:
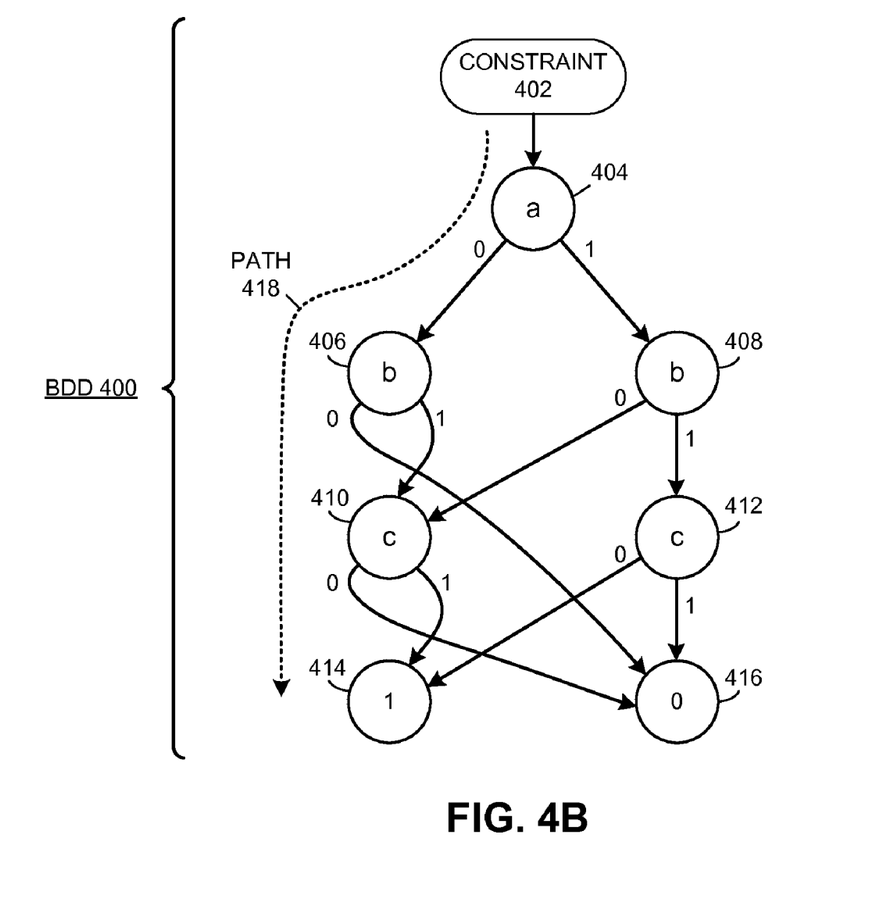
FIG. 4B illustrates a binary decision diagram (BDD) that corresponds to the constraint shown in FIG. 4A.

FIG. 4B illustrates BDD 400 that corresponds to the constraint shown in FIG. 4A. BDD 400 includes nodes 402, 404, 406, 408, 410, 412, 414, and 416. Node 402 can be the root node which can be used to represent the entire constraint. Node 404 can be associated with variable "a," nodes 406 and 408 can be associated with variable "b," and nodes 410 and 412 can be associated with variable "c." Node 414 can represent the Boolean value "TRUE" or "1" for the Boolean function. In other words, node 414 can represent a situation in which the constraint has been satisfied. In contrast, node 416 can represent the Boolean value "FALSE" or "0." In other words, node 416 can represent a situation in which the constraint has not been satisfied.

The directed edges in BDD 400 can represent a value assignment to a variable. For example, the directed edge between nodes 404 and 406 can be associated with assigning value "0" to the random variable "a." Similarly, the directed edge between nodes 408 and 412 can be associated with assigning value "1" to the state variable "b."

A directed path in a BDD from the root node, e.g., node 402, to the terminal node for the Boolean value "TRUE," e.g., node 414, can correspond to a value assignment to the variables that satisfies the set of constraints which is being represented by the BDD, e.g., the constraint shown in FIG. 4A. For example, path 418 begins at node 402 and terminates at node 414. The value assignments associated with path 418 are: a=0, b=1, and c=1. It will be evident that this value assignment causes the Boolean function shown in FIG. 4A to evaluate to "TRUE."

Once the embodiment builds the BDD, it can generate constrained random stimulus by determining all distinct paths from the root node to the terminal node associated with the "TRUE" value, and by randomly selecting a path from the set of all distinct paths.

Note that BDDs are only one of the many different types of canonical representations that can be used to generate the random stimulus. A canonical representation of a logical function (e.g., a constraint) can generally be any representation which satisfies the following property: if two logical functions are equivalent, their canonical representations will be the same as long as the same variable ordering (or an equivalent characteristic) is used while constructing the canonical representation. Examples of canonical representations include, but are not limited to, binary decision diagrams, binary moment diagrams, zero-suppressed binary decision diagrams, multi-valued decision diagrams, multiple-terminal binary decision diagrams, and algebraic decision diagrams.

Bit-Level Operators

Bit-level operators are widely used in chip designs, e.g., processor chips, communication chips, chips that implement networking protocols, etc. Therefore, it is important to efficiently handle bit-level operators during constraint solving.

Conventional word-level ATPG-based constraint solvers may not be able to perform implication for certain bit-level operators. As a result, a set of constraints that include such bit-level operators can cause a large amount of backtracking in conventional ATPG-based constraint solvers.

Some conventional approaches try to handle bit-level operators by using bit-blasting. Unfortunately, such approaches are usually impractical because they can blow-up the size of the constraint representation. For example, some bit-blasting approaches involve using BDDs. In these approaches, each bit in a word-level variable may be represented as a node in the BDD. Unfortunately, the size of the resulting BDD is usually extremely large, which causes such approaches to be impractical.

The shift operator is an example of a bit-level operator that may not be handled efficiently by word-level solvers. The following lines of code illustrate a constraint that uses a shift operator:

```
rand bit[7:0] a;
rand bit[7:0] b;
constraint C3 {
    (a << b) == 8'b11101100;
}
```

Since the result of the shift operation is known, a word-level constraint solver may attempt to backwardly imply this value to variable "a." Some conventional word-level constraint solvers may try to enumerate all possible values of the variable "a." For the constraint C3 shown above, the solver may enumerate the following seven values: {8'b11101100, 8'b01110110, 8'b11110110, 8'b00111011, 8'b01111011, 8'b10111011, 8'b11111011}. Specifically, in this case, the enumerated values can grow exponentially with the number of zeros from least significant bit of the result value.

If the number of enumerated values is too large, it may degrade performance of the constraint solver. To avoid this problem, the constraint solver may use a conservative range (e.g., {0:255}) for variable "a" when the number of enumerated values is too large. Unfortunately, using such a conservative range can cause excessive backtracking which can again degrade performance of the constraint solver.

Conventional word-level constraint solvers have similar difficulties when handling constraints with other bit-level operators and concatenation operators.

Efficiently Handling Bit-Level Operators in Constraints

Some embodiments described in this disclosure provide methods and apparatuses that facilitate performing complete implication for constraints that use bit-level operators. Specifically, some embodiments described in this disclosure can represent the assignable values associated with a node in a circuit model by using a dual value system: a word-level value system and a bit-level value system. Then, during implication, the embodiments can perform implication using both the word-level value system and the bit-level value system. Some embodiments described in this disclosure provide constraint solvers that efficiently handle constraints that use bit-level operators because (1) the embodiments perform implication more effectively due to the use of a dual value system, and (2) the embodiments avoid the drawbacks of bit-blasting.

In some embodiments described herein, the assignable values for at least some of the nodes in the word-level circuit model are represented using a range and a set of bit-level intervals (a set of bit-level intervals is also referred to as a bitmask in this disclosure). In some embodiments, each bit in the bitmask can take on the following three values: 0, 1, and X, wherein "X" represents a don't care value. Specifically, two integral values can be used to represent a bitmask. Specifically, each bit of the bitmask can be represented using the corresponding bits from the two integral values, e.g., 0 may be represented by 2'b01, 1 may be represented by 2'b10, X may be represented by 2'b11, and 2'b00 may not be used.

Figure 5A:
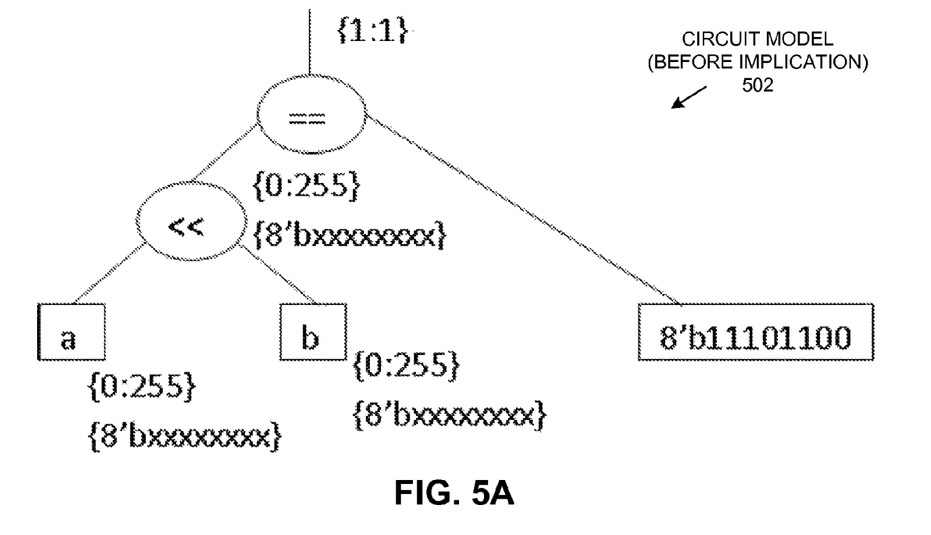
FIGS. 5A-5B illustrate an example of how a dual value system can be used to perform implication in accordance with some embodiments described in this disclosure.
Figure 5B:
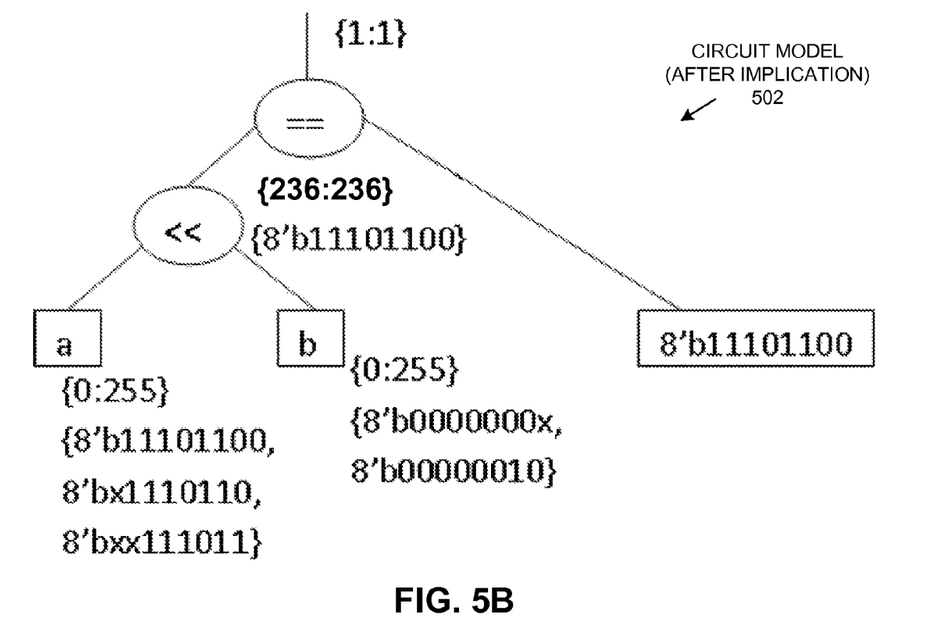

FIGS. 5A-5B illustrate an example of how a dual value system can be used to perform implication in accordance with some embodiments described in this disclosure.

As shown in FIG. 5A, circuit model 502 corresponds to the above-described constraint C3 that uses a left shift operator. Circuit model 502 includes internal nodes that correspond to the equality (==) and left shift (<<) operators, and terminal nodes that correspond to variables "a," "b," and constant 8'b11101100.

In some embodiments, once the circuit model has been built, the constraint solver can initialize each node with an initial range. For example, in some embodiments, the constraint solver can initialize a node with the maximum range based on the precision of the node. For example, if the node corresponds to an unsigned 8-bit value, the constraint solver can initialize the node with a range of {0:255}. If the node is also associated with a bitmask, the bitmask can be initialized with X values. FIG. 5A shows that the nodes corresponding to variables "a" and "b" have been initialized with the maximum range of {0:255}, and the bitmasks have been initialized with Xs.

The constraint solver can then perform static implication and static learning to refine the ranges of primary inputs "a" and "b." FIG. 5B illustrates the result after performing static implication and static learning. Since "<<" is a bit-level operator, the constraint solver may perform an incomplete implication in the word-level value system from output to both inputs. As a result, the ranges of both "a" and "b" remain the same as their initial values. However, the assignable values of both "a" and "b" in the bit-level value system are substantially reduced because of the complete backward implication through the "<<" operator in the bit-level value system. As shown in FIG. 5B, the number of assignable values in the word-level value system is much larger than the number of assignable values in the bit-level value system. In other words, in this case, static implication and static learning do not reduce the search space in the word-level value system, but they substantially reduce the search space in the bit-level value system.

If the bitmask information was not present, the constraint solver may have selected a value for variable "a" from the range {0:255} during the automatic test pattern generation (ATPG) phase. Note that only seven of the 256 possible values for "a" result in a variable assignment that satisfies the constraint; the remaining 249 values result in a conflict and cause backtracking. Therefore, without the bitmask information the constraint solver is expected to perform a large amount of backtracking.

However, in some embodiments, the constraint solver can use the bitmask information to select only those values for variable "a" that will be consistent with the constraint. For example, in some embodiments, the constraint solver may select a value 8'b01110110 for variable "a" that satisfies both range and bitmask values. Next, the constraint solver can invoke the implication engine to propagate this decision (i.e., the value assignment to variable "a") to determine that variable "b" should be assigned value 1. In this manner, some embodiments described herein can determine a satisfiable solution to the constraint without any backtracking.

In some embodiments, an embodiment (e.g., an ATPG-based constraint solver) can receive a set of constraints. The set of constraints may include constraints that use bit-level operators. The bit-level operators can include any bitwise operator, e.g., bitwise negation, AND, OR, NAND, NOR, XOR, XNOR, etc. The bit-level operators can also include left and right shift operators, concatenation operator, replication operator, etc. The processing (e.g., implication, decision making, etc.) performed on the bit-level value system is not restricted to bitwise operators, and can be extended to conventional word-level operators, such as addition, subtraction, multiplication, relational operators, etc.

Next, the embodiment can build a circuit model based on the set of constraints. As part of building the circuit model, the embodiment can determine a subset of nodes in the circuit model that will keep track of assignable values in two value systems. Specifically, the embodiment can identify nodes in the circuit model that correspond to bit-level operators, and perform a reachability analysis to determine the subset of nodes in the circuit model. The embodiment can then keep track of the assignable values for these nodes in the two value systems.

In some embodiments, the reachability analysis can be performed as follows. First, the embodiment can identify all nodes that are associated with bit-level logical operators, shift operators, and concatenation operators.

Next, if bitmask implication is not expected to shrink the range of a given node, the embodiment can mark the node as not requiring a bitmask. Specifically, in some embodiments, bitmask implication is not expected to shrink the range of a node if one or more of the following conditions are satisfied: (1) the bitmask node is associated with a bit-level operator and all immediate inputs have a 1-bit precision, i.e., they are 1-bit long; (2) all transitive primary inputs of the node have 1-bit precision (the rationale for this condition is that, if we assume that a 1-bit primary input has a 50% chance of being assigned correctly, then, empirically, not associating the node with a bitmask is expected to result in better performance than associating the node with a bitmask and performing bit-level implication); and (3) if all transitive primary inputs of the node are constants.

Once the embodiment has identified a set of nodes in the circuit model that are associated with bit-level operators and that will use a bitmask, the embodiment can then begin from each one of those identified nodes and traverse the circuit model backwards to mark primary inputs, bit slices, and/or internal nodes in the circuit model as requiring a bitmask. Next, the embodiment can start from the set of nodes that were marked as requiring a bitmask (including the initial set of nodes and the nodes that were marked during the backward traversal), and perform a forward traversal to mark the nodes encountered as also requiring a bitmask.

Once the embodiment has determined the nodes that will only use a word-level value system, and the nodes that will use both a word-level value system and a bit-level value system, the embodiment can then perform static implication.

During static implication, the embodiment can propagate values in the circuit model to refine the search space for both value systems. The embodiment can use the bitmask to perform forward and backward implication for bit-level operators. For word-level operators, the embodiment can perform implication using the word-level ranges.

According to one definition, complete implication occurs when the set of allowable input values and the set of allowable output values for an operator are consistent with one another. Specifically, according to one definition, complete implication occurs when (1) if we select input values based on the set of allowable input values, then the output of the operator will be in the set of allowable output values, and (2) for each output value in the set of allowable output values, there exists at least one combination of input values in the set of allowable input values that will produce the output value. According to one definition, incomplete implication occurs if at least one of these two conditions is not satisfied.

For performance reasons, an embodiment may not perform complete implication propagation for all operators. According to one definition, an operator's implication propagation is considered complete if there is no loss of information in its forward or backward interval/range propagation. For example, consider the '>' comparator operator. Both forward and backward implications through this operator can be performed completely. In other words, after the static implication process, the range of values that are implied onto a node are complete.

However, for other operators, it may not be efficient to perform complete implication. For example, consider a 32-bit unsigned variable "a" with the following constraint: (a % 2)==0. The initial range of values for variable "a" consists of $2^{32}$ values: {0:4294967295}. The backward propagation across the modulo ("%") operator essentially requires us to represent only even values in this range. Therefore, performing complete implication may require the embodiment to perform massive splitting of the range values for this node. As a result, some embodiments conservatively propagate the maximum range for this node, which also includes the odd values. Since the implication was incomplete, the embodiment may assign an odd value to "a" which may cause backtracking Note that the bit-level implication can affect the word-level range, and word-level implication can affect the bitmask. Specifically, when the embodiment performs bit-level implication using the bitmask, the embodiment may modify the word-level range based on the implied bitmask. Conversely, when the embodiment performs word-level implication using the word-level ranges, the embodiment may modify the bitmask based on the implied word-level range. This process, in which the bit-level implication affects the word-level range and the word-level implication affects the bitmask, may occur for multiple iterations.

For example, suppose the initial word-level range is {0:255} and the bitmask is 8'bXXXXXXXX. After performing a round of bit-level implication, the bitmask may become 8'b0XXXXXXX. At this point, the embodiment may change the word-level range to {0:127} so that it is consistent with the bitmask. However, this change in the word-level range may trigger a round of word-level implication, which may cause the word-level range to become {0:31, 64:95}. In response, the embodiment may modify the bitmask to 8'b0X0XXXXX so that it is consistent with the world-level range of {0:31, 64:96}. This iterative process can continue until the word-level range and the bitmask stabilize.

Next, the embodiment can perform static learning. During static learning, the embodiment can propagate values from OR/AND constraints to further refine search space. During this stage, modifications to the bitmask may cause modifications to the word-level range, and vice versa.

The embodiment can then assign values to variables using an ATPG-based approach. Specifically, the embodiment can select values that satisfy both the word-level range and the bitmask. In some embodiments, the embodiment can select a value based on the word-level range and ensure that the selected value satisfies the bitmask. Alternatively, the embodiment can select a value based on the bitmask and ensure that the selected value satisfies the word-level range.

In the above-described examples, a bitmask was shown has having a single bitmask interval. However, the term "bitmask," as used in this disclosure, can be a set of one or more bitmask intervals. For example, a bitmask can be the following set of three bitmask intervals: {8'b11101100, 8'bX1110110, 8'bXX111011}.

Each bit in a bitmask interval can be represented using two bits, e.g., 0 may be represented by 2'b01, 1 may be represented by 2'b10, X may be represented by 2'b11, and 2'b00 may not be used (i.e., the value 2'b00 may be invalid). In some embodiments, the two bits that are used to represent a bitmask interval can be stored in two separate values. For example, some embodiments can represent the bitmask interval 8'bXX111011 using the following two values: V1=8'b11111011 and V2=8'b11000100. The corresponding bits in values V1 and V2 when taken together encode the value of the corresponding bit in the bitmask interval. For example, the least significant bits of V1 and V2 are 1 and 0, respectively. Therefore, the least significant bit of the bitmask interval is 1, which corresponds to the encoding 2'b10. The most significant bits of V1 and V2 are 1 and 1, respectively. Therefore, the most significant bit of the bitmask interval is X, which corresponds to the encoding 2'b11.

To assign a random value to a random variable, the embodiment can select a range for the variable. The range can be randomly selected from the current node value. If the variable also has a bitmask, the selected range can be compared against the bitmask (e.g., a set of bitmask intervals) to check if the selected range is consistent with the bitmask. If the selected range is not consistent with the bitmask, the embodiment can create a new range or modify the selected range based on the bitmask. This process can be iteratively performed till a range is determined that satisfies both the word-level range and the bitmask associated with the variable.

Figure 6:
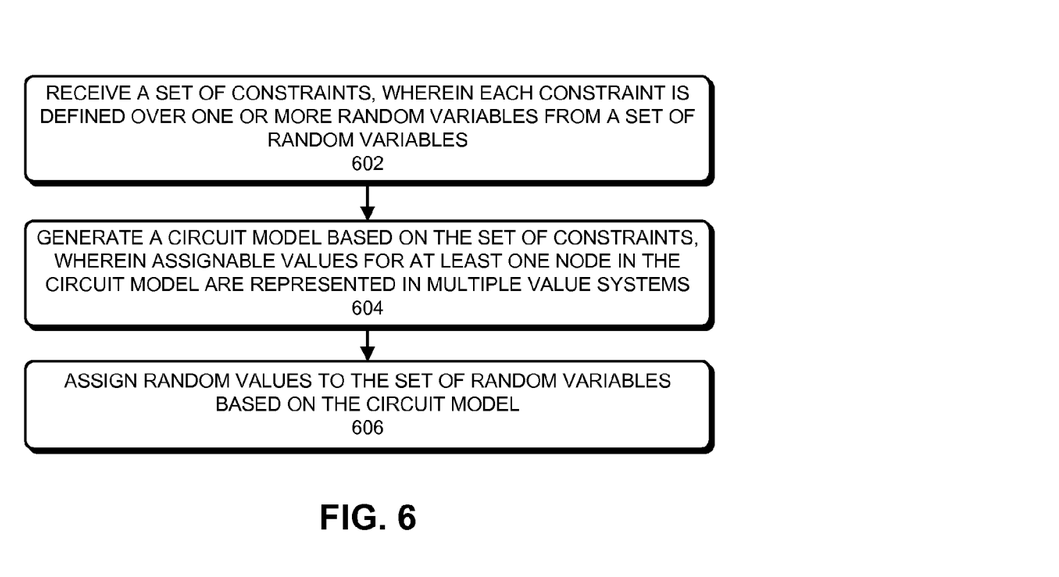
FIG. 6 presents a flowchart that illustrates a process for assigning random values to a set of random variables in accordance with some embodiments described in this disclosure.

FIG. 6 presents a flowchart that illustrates a process for assigning random values to a set of random variables in accordance with some embodiments described in this disclosure.

The process may begin with an embodiment (e.g., an ATPG-based constraint solver) receiving a set of constraints, wherein each constraint is defined over one or more random variables from the set of random variables (operation 602). In some embodiments, the set of constraints includes one or more constraints that use one or more bit-level operators.

Next, the embodiment can generate a circuit model based on the set of constraints, wherein assignable values for at least one node in the circuit model are represented in multiple value systems (operation 604). In some embodiments, the multiple value systems can include a word-level value system and a bit-level value system. In some embodiments, the assignable values are represented in the word-level value system by specifying a range, i.e., a set of one or more intervals. In some embodiments, the assignable values are represented in the bit-level value system by specifying a bitmask. As mentioned above, a bitmask can include one or more bitmask intervals, wherein each bit of a bitmask interval can have one of the following three values: 0, 1, or X.

In some embodiments, generating the circuit model can include performing a reachability analysis on the circuit model to determine nodes whose assignable values are to be represented in multiple value systems, e.g., both a word-level value system and a bit-level value system.

The embodiment can then assign random values to the set of random variables based on the circuit model (operation 606). In some embodiments, assigning random values to the set of random variables can include modifying a representation of the assignable values in a first value system based on performing implication on the circuit model in a second value system, wherein the first value system is different from the second value system. For example, if the multiple value systems include a word-level value system and a bit-level value system, the embodiment can: (1) modify a bit-level representation of the assignable values based on performing a word-level implication on the circuit model, and/or (2) modify a word-level representation of the assignable values based on performing a bit-level implication on the circuit model.

Decision making can be defined as a process in which an embodiment (e.g., a constraint solver) assigns values to the random variables by: (1) arranging the nodes in the circuit model in a given order, (2) selecting values for each node in the given order, and (3) optionally invoking an implication engine after a value is selected for each node to further restrict the value ranges for other nodes. If a conflict is detected during the decision making process, the embodiment can backtrack and select a different value for one or more nodes. During decision making, some embodiments described herein can select a value for a node based on representations of the assignable values in the multiple value systems.

Figure 7:
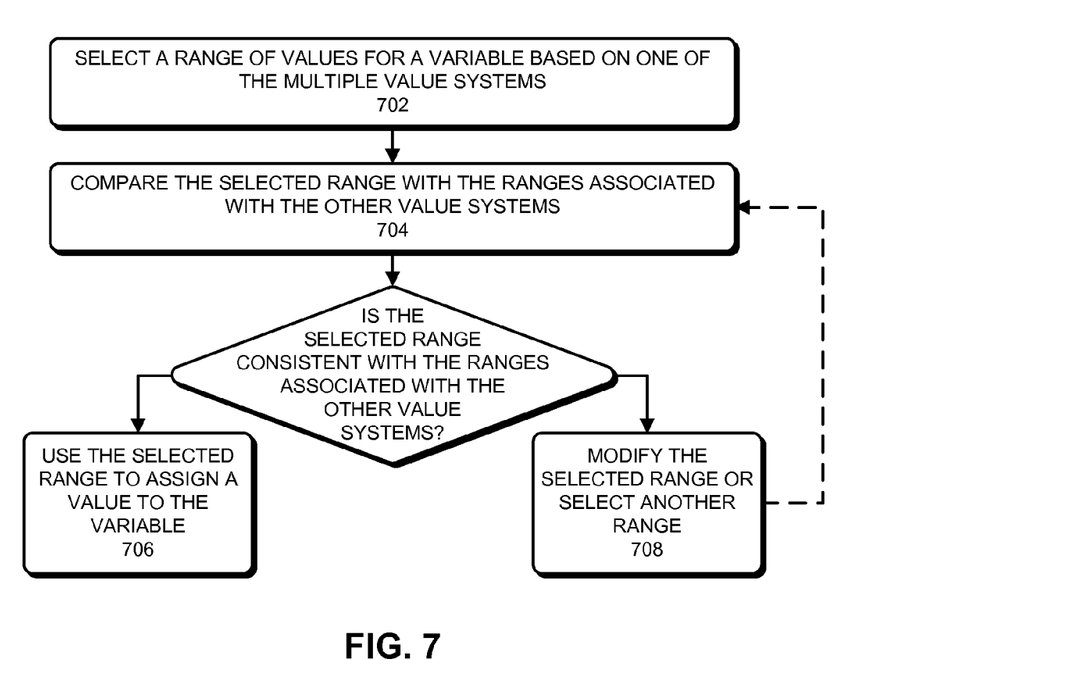
FIG. 7 presents a flowchart that illustrates a process for decision making in accordance with some embodiments described in this disclosure.

FIG. 7 presents a flowchart that illustrates a process for decision making in accordance with some embodiments described in this disclosure.

The process may begin with an embodiment (e.g., an ATPG-based constraint solver) selecting a range of values for a variable based on one of the multiple value systems (operation 702). Next, the embodiment can compare the selected range with the ranges associated with the other value systems (operation 704). This comparison can be performed in a serial or parallel fashion. If the selected range is consistent with the ranges associated with the other value systems ("YES" branch), the embodiment can use the selected range to assign a value to the variable (operation 706). On the other hand, if the selected range is inconsistent with one or more ranges associated with the other value systems, the embodiment can modify the selected range or select another range (operation 708). The embodiment can then optionally return to operation 704. Specifically, if the embodiment modifies the selected range or selects another range so that the new range is guaranteed to be consistent with the ranges associated with the other value systems, then the embodiment may not need to return to operation 704. On the other hand, if the modification or selection process does not provide such guarantees, then the embodiment may need to return to operation 704 to check consistency.

Figure 8:
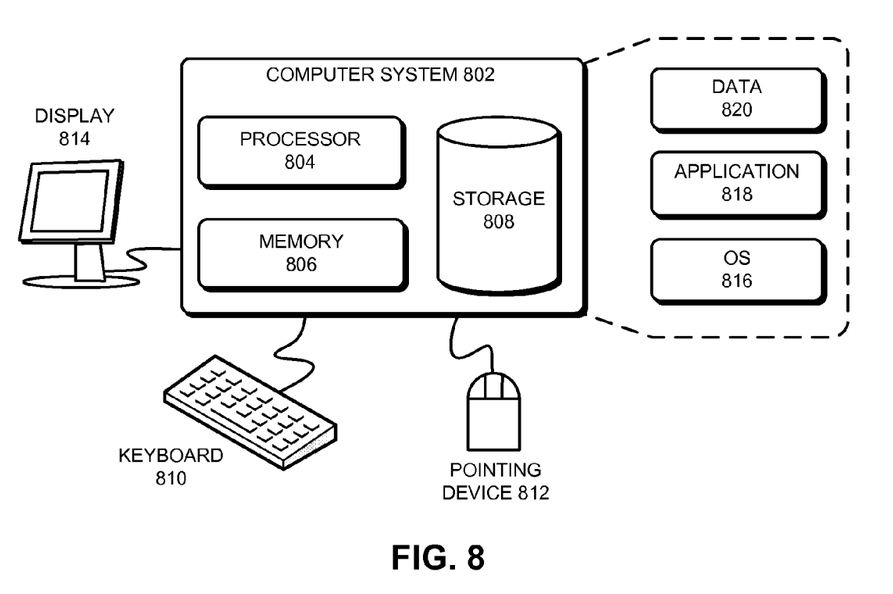
FIG. 8 illustrates a computer system in accordance with some embodiments described in this disclosure.

FIG. 8 illustrates a computer system in accordance with some embodiments described in this disclosure. Computer system 802 can include processor 804, memory 806, and storage device 808. Computer system 802 can be coupled to display device 814, keyboard 810, and pointing device 812. Storage device 808 can store operating system 816, application 818, and data 820. Data 820 can include constraints.

Computer system 802 may automatically perform any method that is implicitly or explicitly described in this disclosure. Specifically, during operation, computer system 802 can load application 818 into memory 806. Application 818 can generate a circuit model based on a set of constraints, wherein assignable values for at least one node in the circuit model are represented in a word-level value system and a bit-level value system. Applicant 818 may then assign random values to the set of random variables based on the circuit model.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for assigning random values to a set of random variables, the method comprising:
   receiving a set of constraints, wherein each constraint is defined over one or more random variables from the set of random variables;
   generating a circuit model based on the set of constraints, wherein assignable values for at least one node in the circuit model are represented in multiple value systems; and
   assigning, by using one or more computers, random values to the set of random variables based on the circuit model.

2. The method of claim 1, wherein the set of constraints includes one or more constraints that use one or more bit-level operators.

3. The method of claim 1, wherein the multiple value systems include a word-level value system, and wherein the assignable values are represented in the word-level value system by specifying a range.

4. The method of claim 1, wherein the multiple value systems include a bit-level value system, and wherein the assignable values are represented in the bit-level value system by specifying a bitmask.

5. The method of claim 1, wherein said generating includes performing a reachability analysis on the circuit model to determine nodes whose assignable values are to be represented in multiple value systems.

6. The method of claim 1, wherein said assigning includes modifying a representation of the assignable values in a first value system based on performing implication on the circuit model in a second value system, wherein the first value system is different from the second value system.

7. The method of claim 6, wherein the first value system is a bit-level value system and the second value system is a word-level value system.

8. The method of claim 6, wherein the first value system is a word-level value system and the second value system is a bit-level value system.

9. The method of claim 1, wherein said assigning includes selecting a value for a node based on representations of the assignable values in the multiple value systems.

10. A non-transitory computer-readable storage medium storing instructions that when executed by a computer cause the computer to perform a method for assigning random values to a set of random variables, the method comprising:
receiving a set of constraints, wherein each constraint is defined over one or more random variables from the set of random variables;
generating a circuit model based on the set of constraints, wherein assignable values for at least one node in the circuit model are represented in multiple value systems; and
assigning random values to the set of random variables based on the circuit model.

11. The non-transitory computer-readable storage medium of claim 10, wherein the set of constraints includes one or more constraints that use one or more bit-level operators.

12. The non-transitory computer-readable storage medium of claim 10, wherein the multiple value systems include a word-level value system, and wherein the assignable values are represented in the word-level value system by specifying a range.

13. The non-transitory computer-readable storage medium of claim 10, wherein the multiple value systems include a bit-level value system, and wherein the assignable values are represented in the bit-level value system by specifying a bitmask.

14. The non-transitory computer-readable storage medium of claim 10, wherein said generating includes performing a reachability analysis on the circuit model to determine nodes whose assignable values are to be represented in multiple value systems.

15. The non-transitory computer-readable storage medium of claim 10, wherein said assigning includes modifying a representation of the assignable values in a first value system based on performing implication on the circuit model in a second value system, wherein the first value system is different from the second value system.

16. The non-transitory computer-readable storage medium of claim 15, wherein the first value system is a bit-level value system and the second value system is a word-level value system.

17. The non-transitory computer-readable storage medium of claim 15, wherein the first value system is a word-level value system and the second value system is a bit-level value system.

18. The non-transitory computer-readable storage medium of claim 10, wherein said assigning includes selecting a value for a node based on representations of the assignable values in the multiple value systems.

19. A computer system, comprising:
a processor; and
a non-transitory computer-readable storage medium storing instructions that when executed by the processor cause the computer system to perform a method for assigning random values to a set of random variables, the method comprising:
receiving a set of constraints, wherein each constraint is defined over one or more random variables from the set of random variables;
generating a circuit model based on the set of constraints, wherein assignable values for at least one node in the circuit model are represented in multiple value systems; and
assigning random values to the set of random variables based on the circuit model.

20. The computer system of claim 19, wherein the set of constraints includes one or more constraints that use one or more bit-level operators.

21. The computer system of claim 19, wherein the multiple value systems include a word-level value system, and wherein the assignable values are represented in the word-level value system by specifying a range.

22. The computer system of claim 19, wherein the multiple value systems include a bit-level value system, and wherein the assignable values are represented in the bit-level value system by specifying a bitmask.

23. The computer system of claim 19, wherein said generating includes performing a reachability analysis on the circuit model to determine nodes whose assignable values are to be represented in multiple value systems.

24. The computer system of claim 19, wherein said assigning includes modifying a representation of the assignable values in a first value system based on performing implication on the circuit model in a second value system, wherein the first value system is different from the second value system.

25. The computer system of claim 24, wherein the first value system is a bit-level value system and the second value system is a word-level value system.

26. The computer system of claim 24, wherein the first value system is a word-level value system and the second value system is a bit-level value system.

27. The computer system of claim 19, wherein said assigning includes selecting a value for a node based on representations of the assignable values in the multiple value systems.

* * * * *